US008414991B2

(12) United States Patent
Suzuki et al.

(10) Patent No.: US 8,414,991 B2
(45) Date of Patent: Apr. 9, 2013

(54) CONDUCTIVE ENDLESS BELT

(75) Inventors: Takahiro Suzuki, Tokyo (JP); Toshiyuki Osaki, Tokyo (JP); Kunio Machida, Tokyo (JP); Yoichi Nishimuro, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 877 days.

(21) Appl. No.: 11/595,934

(22) Filed: Nov. 13, 2006

(65) Prior Publication Data
US 2007/0116958 A1 May 24, 2007

(30) Foreign Application Priority Data

Nov. 14, 2005 (JP) ................. 2005-328785
Mar. 29, 2006 (JP) ................. 2006-091811
Sep. 15, 2006 (JP) ................. 2006-250669

(51) Int. Cl.
*B32B 25/08* (2006.01)
*B32B 25/14* (2006.01)
*B32B 27/18* (2006.01)
*B32B 27/36* (2006.01)
*G03G 15/14* (2006.01)

(52) U.S. Cl.
USPC ....... 428/36.8; 428/34.1; 428/35.7; 428/36.9; 428/480; 399/302; 399/308; 430/125.3; 430/125.32; 526/437; 526/444

(58) Field of Classification Search .................... None
See application file for complete search history.

(56) References Cited

U.S. PATENT DOCUMENTS

| | | | | |
|---|---|---|---|---|
| 3,907,926 A | * | 9/1975 | Brown et al. | 524/258 |
| 4,315,882 A | * | 2/1982 | Hiratsuka et al. | 264/174.11 |
| 4,598,117 A | * | 7/1986 | Liu et al. | 524/444 |
| 4,857,604 A | * | 8/1989 | Agarwal | 525/439 |
| 5,128,091 A | * | 7/1992 | Agur et al. | 264/512 |
| 6,044,243 A | * | 3/2000 | Hara | 399/302 |
| 6,184,410 B1 | * | 2/2001 | Bollmann et al. | 560/26 |
| 6,670,429 B2 | * | 12/2003 | Appelman et al. | 525/444.5 |
| 7,144,621 B2 | * | 12/2006 | Tanaka et al. | 428/212 |
| 7,244,790 B2 | * | 7/2007 | Sunkara et al. | 525/327.4 |
| 2001/0033205 A1 | * | 10/2001 | Ikeda | 333/26 |
| 2004/0013863 A1 | | 1/2004 | Terakawa et al. | |
| 2006/0172097 A1 | * | 8/2006 | Morikoshi et al. | 428/35.7 |
| 2009/0074480 A1 | * | 3/2009 | Suzuki | 399/308 |

FOREIGN PATENT DOCUMENTS

| | | | |
|---|---|---|---|
| JP | 08-007505 A | | 1/1996 |
| JP | 09-227717 A | | 9/1997 |
| JP | 10-120924 A | | 5/1998 |
| JP | 11-315192 | * | 11/1999 |
| JP | 2000-062993 A | | 2/2000 |
| JP | 2000-143954 | * | 5/2000 |
| JP | 2000-327922 A | | 11/2000 |
| JP | 2001-138380 A | | 5/2001 |
| JP | 2002-132053 | * | 5/2002 |

(Continued)

*Primary Examiner* — Vivian Chen
(74) *Attorney, Agent, or Firm* — Sughrue Mion, PLLC

(57) ABSTRACT

A conductive endless belt is composed of elastomer polyester with a crystalline melting point at 210° C. or more, or mainly composed of the elastomer polyester, and a thermoplastic polyester-based resin at 49 wt % or less, added a polymer ion conductive agent and a carbon black. The conductive endless belt. satisfies elastic modulus, creep resistance, bending durability, etc. and has decreased volume resistance variation and environment dependency while having superior durability, glossiness and setting performance that satisfying desired performance, without causing problems such as offset image.

6 Claims, 3 Drawing Sheets

FOREIGN PATENT DOCUMENTS

| | | | |
|---|---|---|---|
| JP | 2002-132053 | A | 5/2002 |
| JP | 2002-187141 | * | 7/2002 |
| JP | 2002-287531 | A | 10/2002 |
| JP | 2003-029537 | * | 1/2003 |
| JP | 2003-029537 | A | 1/2003 |
| JP | 2004-258153 | * | 9/2004 |
| JP | 2004-272209 | A | 9/2004 |
| JP | 2005-060658 | A | 3/2005 |
| JP | 2005-062822 | * | 3/2005 |
| JP | 2005-062822 | A | 3/2005 |
| WO | 2005-073315 | A1 | 11/2005 |

* cited by examiner

CONDUCTIVE ENDLESS BELT

FIELD OF THE INVENTION

This invention relates to a conductive endless belt (hereinafter simply refer to as "belt") used for transferring toner image on recording medium such as paper, in the electrostatic recording process in electrophotographic machines such as copying machine and printer, and electrostatic recording machines, latent image carrier, etc. carrying electrostatic latent image on surface thereof that is formed by supplying developer to the surface of image forming body, and an image forming apparatus using it.

BACKGROUND OF THE INVENTION

Conventionally, in the electrostatic recording process of copying machine, printer, etc., the following print method is employed. First, by uniformly charging the surface of a photo conductor (latent image carrier), then projecting an image from an optical system, and removing charge from a part where is projected the light, an electrostatic latent image is formed. Then, by supplying toner with this electrostatic latent image to form a toner image by electrostatic attraction, and transferring this image to a recording medium such as paper, OHP, developing paper, the printing is completed.

In this case, printing is basically carried out in accordance with the process in color printers and color copying machines, but in the case of color printing, color tone is remanufactured by using four color toners including magenta, yellow, cyan and black. Therefore a process to obtain necessary color tone by superposing these toners in predetermined ratio is required, and several systems for carrying out this process have been presented.

First, there is image on image development in which developing is carried out by superposing the four color toners including magenta, yellow, cyan and black in order similarly to black and white printing, in the process of visualizing an electrostatic latent image by supplying toner on a photo conductor to form a color toner image on the photo conductor. This system enables the comparatively compact apparatus structure. However, controlling gradation is very difficult in this system, so there is a problem that high image quality cannot be obtained.

Second, there is a tandem system that four photo conductive drums are provided, and by developing latent images of each drums with magenta, yellow, cyan and black toner respectively, four toner images including a toner image formed by magenta, toner image formed by yellow, toner image formed by cyan and toner image formed by black are formed, then photo conductive drums formed these toner images are arranged in tandem, each toner image is transfer to a recording medium such as paper in order, and reproduce color image by superposing the images on the recording medium. This system provides a good image, but four photo conductive drums, charge mechanisms and develop mechanisms for each photo conductive drum are arranged in tandem, which increasing the size as well as price of the apparatus.

FIG. 2 shows a structural example of a printing unit in an image forming apparatus of the tandem system. Four printing units, each unit comprising a photo conductive drum 1, an electrostatic roll 2, a developing roll 3, a developing blade 4, a toner supply roll 5 and a cleaning blade 6, are arranged in tandem to correspond with respective toner of yellow Y, magenta M, cyan C and black B, is driven by driving roller (driving member) 9 circularly to transfer the toners in order onto the paper transported by a transfer transport belt 10, and then color image is formed. The transfer transport belt is charged/discharged by a charging roll 7/discharging roll 8, respectively. To charge a paper for attracting the paper to the belt, an attaching roller (not shown) is used. These processes can reduce the occurrence of ozone. The attaching roller feeds the paper from a transport path onto the transfer transport belt, while electrostatically attracting the transfer transport belt. In addition, after transfer, the paper can be separated simply by self stripping that is caused by decreasing transfer electric pressure to decrease the attraction force between the paper and the transfer transport belt.

There are resistive material and dielectric material as the material of the transfer transport belt 10, which respectively has advantages and disadvantages. A belt made of resistive material can hold charge for a short time, so that when being used for transfer in the tandem system, charge injection in transfer is less and electric pressure doesn't go up so much even in the case which four colors are successively transferred. Additionally, charge is discharged when the belt is used repeatedly for transfer to the next paper; therefore electrical reset is not needed. However, resistance value changes depending on environmental variation, which affects transfer efficiency. The belt tends to be affected by the thickness and width of the paper, which is also disadvantage.

Meanwhile in the case of the dielectric material belt, injected charge is not naturally discharged, so that both injection and discharge of charge have to be electrically controlled. However, charge is stably held, hence the attraction of a paper is ensured and paper transport with high accuracy is implemented. Since the dielectric constant has a reduced dependency on the temperature and relative humidity, the transfer process is comparatively stable with respect to environment. Repeating transfer accumulates charge on the belt, therefore transfer electric pressure goes high, disadvantageously.

Third, there is a transfer drum system that a recording medium such as paper is rolled around a transfer drum and rotated for four times, in each rotation magenta, yellow, cyan, and black toner on a photo conductor is transferred in order onto the recording medium to reproduce a color image. This system provides relatively high image quality. However, there is a problem that the type of the recording medium recording medium is limited, since heavy paper such as post card is hard to be rolled on the transfer drum.

As an alternative system for the image on image print system, the tandem system and the transfer drum system, the intermediate transfer system that is capable of obtaining high quality image while not increasing the size of apparatus nor limiting the type of recording medium is presented.

In other word, in this intermediate transfer system, an intermediate transfer member including a drum or a belt which temporally transfers and holds a toner image on a photo conductor is provided, and around the intermediate transfer member, four photo conductors, respectively forming a toner image formed by magenta, a toner image formed by yellow, a toner image formed by cyan and a toner image formed by black, are provided, by transferring the four-color toner images onto to the intermediate transfer member in order, a color image is formed on the intermediate transfer member to transfer the color image onto a recording medium such as paper. Since the system adjusts gradation by superposing the four-color toner images, it is possible to obtain high image quality, at the same time, no needs to arrange photo conductors in tandem like the tandem system doesn't specially increase the size of apparatus, and moreover, no need to roll a recording medium around the drum doesn't limit the type of recording medium.

As an example apparatus forming color images by intermediate transfer system, an image forming apparatus using an endless belt like an intermediate transfer member as an intermediate transfer member is illustrated in FIG. 3.

In FIG. 3, numeral 11 is a drum type photo conductor and is configured to rotate in the arrow direction in the figure. This photo conductor 11 is charged by a first charge unit 12, and then charge on a portion exposed by image exposure 13 is eliminated, then an electrostatic latent image corresponding to a first color component is formed on the photo conductor 11, further the electrostatic latent image is developed by a developing unit 41 with the first color magenta toner M, and the first color magenta toner image is formed on the photo conductor 11. Next, this toner image is driven by a driving roller (driving member) 30 cyclically to be transferred to cyclically rotating an intermediate transfer member 20 while being in contact with the photo conductor 11. In this case, the transfer from the photo conductor 11 to the intermediate transfer member 20 is carried about by a first transfer bias that is applied from a power supply 61 to the intermediate transfer member 20 at a nip portion between the photo conductor 11 and the intermediate transfer member 20. After the first color magenta toner image is transfer to the intermediate transfer member 20, the photo conductor 11 is cleaned its surface by a cleaning unit 14, and the photo conductor 11 completes the first rotation of the develop and transfer operation. After then, the photo conductor rotates for three times, a second color cyan toner image, a third color yellow toner image and a fourth color black toner image are formed in order on the photo conductor 11 by use of developing units 42-44 respectively, and these toner images are superposing transferred to the intermediate transfer member 20, then a combined color toner image corresponding to a target color image is formed on the intermediate transfer member 20. For the apparatus in FIG. 3, each developing units 41-44 is configured to develop with magenta toner M, cyan toner C, yellow toner Y, and black toner B in order and in turn for every rotation of the photo conductor 11.

Next, a transfer roller 25 comes to contact with the intermediate transfer member 20 formed the combined color toner image, and a recording medium such as paper 26 is fed from a paper feeding cassette 19 to a nip portion between the roller 25 and the member 20. Simultaneously, a second transfer bias is applied from a power supply 29 to the transfer roller 25, the combined color toner image is transferred from the intermediate transfer member 20 to the recording medium 26 to make a final image by heat fusing. The intermediate transfer member 20 after transferring the combined color toner image to the recording medium 26 is removed transfer resident toner on surface thereof by a cleaning unit 35 and is configured to recover to the initial condition for preparing the next image forming.

Also, there is a tandem intermediate transfer system which comminutes the tandem system and the intermediate transfer system. FIG. 4 illustrates an image forming apparatus of the tandem intermediate transfer system for forming color images by use of an endless belt type tandem intermediate transfer member.

In the illustrated apparatus, a first developing unit 54a to a fourth developing unit 54d for developing respective electrostatic latent image on photo conductive drums 52a to 52d with yellow, magenta, cyan, and black are arranged along with a tandem intermediate transfer member 50, and by cyclically driving this tandem intermediate transfer member 50 in the arrow direction in the drawing to successively transfer four-color toner images formed on the photo conductive drums 52a to 52d of respective developing unit 54a to 54d, thereby a color toner image is formed on the tandem intermediate transfer member 50, and by transferring this toner image onto the recording medium such as paper 53, printout is completed. In this case, in either apparatus described above, the arrangement order of the toners used for developing is not limited and can be optionally selected.

Numeral 55 in the drawing indicates a driving roller or a tension roller for cyclically driving the tandem intermediate transfer member 50, numeral 56 indicates a recording medium feeding roller, numeral 57 indicates a recording medium feeding unit, and numeral 58 indicates a fuser unit for fusing an image onto a recording medium by heat and so on. Additionally, numeral 59 indicates a power supply unit (electric pressure applying means) for applying electric pressure to the tandem intermediate transfer member 50. This power supply unit 59 is configured to be capable of reversing positive and negative of applying electric pressure depending on the case where a toner image is transferred to the tandem intermediate transfer member 50 from photo conductive drums 52a to 52d or the case where a toner image is transferred to a recording media 53 from the tandem intermediate transfer member 50.

Conventionally, for conductive endless belts used such as the endless belt type transfer transport belt 10, the intermediate transfer member 20, and the tandem intermediate transfer member 50, etc., semi conductive resin film belt and rubber belt having fiber reinforced member are mainly used. From these, as an example of the resin film belt, in Japanese Published Examined Patent Application No. H8-7505, a belt blended thermoplastic resin and polyether ester amide or polyether amide and sulfonate metal salt or sheet member is disclosed. Also, Japanese Published Unexamined Patent Application No. 2004-272209 discloses a belt that is formed by copolymers having polyether block in elastomer polyester, positive ion and negative ion adding disaggregatable salt, and melamine cyanurate as fire retardant, and Japanese Published Unexamined Patent Application No. 2000-62993 disclosed a belt including conductive base layer which is formed by dispersing conductive filler to polyester polyether resin with fusing point within a range from 160 to 210° C. and has predetermined loss tangent (tan δ) and volume resistive value.

Furthermore, Japanese Published Unexamined Patent Application No. 2003-29537 discloses a belt that is formed by thermoplastic polybutylene terephthalate (PBT) resin and/or thermoplastic PBT elastomer adding polymer ion conductive agent, and Japanese Published Unexamined Patent Application No. 2005-62822 discloses a belt that is formed by PBT and polyester-based thermoplastic elastomer adding thickener and carbon black.

Also, Japanese Published Unexamined Patent Application No. 2002-132053 discloses a conductive endless belt using thermoplastic polyalkylene naphthalate resin or polymer alloy combined the resin and another thermoplastic resin, or polymer blend as a base.

In above mentioned Japanese Published Examined Patent Application No. H8-7505 and Japanese Published Unexamined Patent Application No. 2004-272209, belts added polymer ion conductive agent are disclosed, and it is described that by further adding metal salts, environment dependency that is a disadvantage of polymer ion conductive agent is improved. However, in this case, low melting thermoplastic elastomer is used for the base resin, accordingly elastic modulus of the belt is low and creep resistance has no advantage, so that there is a problem that belt peripheral length is changed by repeat use, which causes problem in the image.

Furthermore, in the art disclosed in Japanese Published Unexamined Patent Application No. 2000-62993, elastomer polyester with low fusing point is used, therefore a similar problem in above mentioned Japanese Published Examined Patent Application No. H8-7505 and Japanese Published Unexamined Patent Application No. 2004-272209 occurs, as well as a problem that resistance variation in belt circumferential direction is high since carbon black is used as a conductive agent.

Moreover, in Japanese Published Unexamined Patent Application No. 2003-29537, PBT and/or polyester-based elastomer which has high elasticity is used, but compatibility among polyether esteramide, PBT and elastomer polyester in polymer ion conductive agent is too good, so that unless added quantity of polyether esteramide is increased, predetermined conductive isn't seen, and as a result, the belt has low elastic modulus. In addition, in Japanese Published Unexamined Patent Application No. 2005-62822, thickener was added to improve dispersibility of high viscosity PBT and low viscosity elastomer polyester, which decreased residence variation, however, since carbon black was used as a conductive agent, the result was not necessarily satisfied.

As described above, any art priory suggested could not fully satisfy the desired performance for the belt, hence implementing higher quality belt with desired elastic modulus and creep resistance as well as with less volume resistance variation and environment dependency has been desired.

On the other hand, in the case which the belt rotating position in driving is controlled by an optic sensor, glossiness of the belt surface is important. In this respect, when a belt is manufactured in a molding method using a mold, the surface nature of the belt can be controlled by the mold, therefore there are less problem, but when a belt is manufactured only in extruding molding, (ref: Japanese Published Unexamined Patent Application No. 2001-138380), effect to the surface nature due to belt material increases. On the other hand, the belt disclosed in Japanese Published Unexamined Patent Application No. 2002-132053 has high glossiness, but has a problem in belt durability due to insufficient flexibility, therefore the crystallization of resin is progressed as using under high temperature and high humidity condition, which deteriorates the setting performance.

Additionally, since the belt disclosed in Japanese Published Unexamined Patent Application No. 2000-62993 uses elastomer with low fusing point, the durability thereof is good, but the belt has problems such as offset image due to occurrence of elongation and image degrading due to deformation under high temperature and high humidity condition.

OBJECTS AND SUMMARY OF THE INVENTION

An object of the present invention is to provide a high quality conductive endless belt with less volume resistance variation and environment dependency while satisfying the desired performance of the belt such as elastic modulus, creep resistance, bending durability, and an image forming apparatus using the belt.

Another object of the present invention is to provide a conductive endless belt with improved durability in addition to various desired performance of the belt such as elastic modulus and an charging characteristics, while satisfying desired performance such as glossiness and setting performance and eliminating problems such as offset image, and an image forming apparatus using the belt.

The inventors of the present invention seriously examined to achieve the first object described above, and found that using elastomer with high fusing point improves elastic modulus as well as creeping property, and using polymer ion conductive agent and carbon black as a conductive agent at the same time enables acquisition of desired residence with small amount of added, that can prevents elastic modulus degrading, as well as a belt with reduced residence variation and environment dependency can be implemented, which leads to complete a first invention.

That is, a conductive endless belt according to a first invention is for transferring and transporting of the tandem system in which a recording medium held by electrostatic attraction, is driven cyclically by a driving member and transported to four kinds of image forming bodies, and respective toner images are successively transferred to the recording medium, and which comprises a base comprising an elastomer polyester with a crystalline melting point at 210° C. or more, or comprising the elastomer polyester as a main component thereof and a thermoplastic polyester-based resin at 49 wt % or less, to which a polymer ion conductive agent and a carbon black are added.

Moreover, another conductive endless belt according to the first invention is of an intermediate transfer member, which is provided between an image forming body and an recording medium, and is driven cyclically by a driving member, for once transferring a toner image formed on a surface of image forming body to a surface of the belt to hold and then transferring the image to the recording medium, and which comprises a base comprising an elastomer polyester with a crystalline melting point at 210° C. or more, or comprising the elastomer polyester as a main component thereof and a thermoplastic polyester-based resin at 49 wt % or less, to which a polymer ion conductive agent and a carbon black are added.

Furthermore, still another conductive endless belt according to the first invention is of tandem intermediate transfer member, which is provided between four kinds of image forming bodies and a recording medium, is driven cyclically by a driving member for once transferring a toner image formed on a surface of four kinds of image forming bodies to a surface of the belt to hold successively and then transferring the image to the recording medium, and which comprises a base comprising an elastomer polyester with a crystalline melting point at 210° C. or more, or comprising the elastomer polyester as a main component thereof and a thermoplastic polyester-based resin at 49 wt % or less, to which a polymer ion conductive agent and a carbon black are added.

In the first invention, for the polymer ion conductive agent, polyether esteramide can be preferably used, and for the thermoplastic polyester-based resin, polybutylene terephthalate or polybutylene naphthalate is preferred. Also, a blending amount of the polymer ion conductive agent is preferably within a range of 1 to 40 parts by weight based on 100 parts by weight of the base, and blending amount of the carbon black is preferably within a range of 5 to 30 parts by weight based on 100 parts by weight of the base.

Additionally, the inventors of the present invention seriously examined to solve the another object described above and found that making a belt with laminated structure formed by multiple layers and making each layer keep different desired performances achieved a belt with superior durability without losing other belt performance while having good glossiness and setting performance to complete a second invention.

That is, a conductive endless belt according to a second invention is for transferring and transporting of the tandem system in which a recording medium held by electrostatic attraction, is driven cyclically by a driving member and transported to four kinds of image forming bodies, and respective toner images are successively transferred to the recording medium, and which comprises a laminated structure having at least a base layer and an outermost layer from inner side to outer side in order, and is formed by co-extrusion, wherein said base layer comprising a thermoplastic elastomer with a crystalline melting point at 210° C. or more as a main component and said outermost layer comprising a thermoplastic resin as a main component.

Moreover, another conductive endless belt of the second invention is of an intermediate transfer member, which is provided between an image forming body and an recording medium which is driven cyclically by a driving member, for once transferring a toner image formed on a surface of image forming body to a surface of the belt to hold and then transferring the image to the recording medium, and which comprises a laminated structure having at least a base layer and an outermost layer from inner side to outer side in order, and is formed by co-extrusion, wherein said base layer comprising a thermoplastic elastomer with a crystalline melting point at 210° C. or more as a main component and said outermost layer comprising a thermoplastic resin as a main component.

Furthermore, still another conductive endless belt of the second invention is of a tandem intermediate transfer member provided between four kinds of image forming bodies and a recording medium, which is driven cyclically by a driving member for once transferring a toner image formed on a surface of four kinds of image forming bodies to a surface of the belt to hold successively and then transferring the image to the recording medium, and which comprises a laminated structure having at least a base layer and an outermost layer from inner side to outer side in order, and is formed by co-extrusion, wherein said base layer comprising a thermoplastic elastomer with a crystalline melting point at 210° C. or more as a main component and said outermost layer comprising a thermoplastic resin as a main component.

In the second invention, for the thermoplastic resin, polyester-based resin, and for thermoplastic elastomer, elastomer polyester are preferably used respectively. In this case, respective the outermost layer or the base layer including carbodiimide compound is proffered. Furthermore, the tensile elastic modulus of the belt of the second invention is 800 MPa or more. For the belt of the second invention, the base layer means the thickest layer in the laminated structure.

Also, an image forming apparatus of the present invention comprises using the conductive endless belt according to the present invention.

According to the first invention, by forming the above structure, desired performance of the belt such as elastic modulus, creep resistance, and bending durability is satisfied, while implementing a belt with less volume resistance variation and environment dependency. Therefore, an image forming apparatus using such belt of the present invention is capable of providing good image without causing problems such as poor imaging derived from elongation and deformation of the belt.

According to the second invention, by forming the above structure, a belt with various desired performance of the belt such as elastic modulus, charging characteristics as well as good durability, while satisfying desired performance in glossiness and setting performance can be implemented. Therefore, an image forming apparatus using such belt of the present invention is capable of providing good image without causing problems such as poor imaging derived from elongation and deformation of the belt

BRIEF DESCRIPTION OF THE DRAWINGS

FIG. 1(a) is a cross sectional view of an embodiment of the second invention having one engaging unit.

DETAILED DESCRIPTION OF THE PREFERRED EMBODIMENTS

Specifically described below is a preferred embodiment of the present invention.

Conductive endless belts generally include a joint type and a Pointless type (so-called seamless belt), and either type may be used in the present invention. It is preferably a seamless belt. The conductive endless belt of the present invention can be used as a transfer member and the like of the tandem system, intermediate transfer system, and tandem intermediate transfer system as described above.

Figure 2:
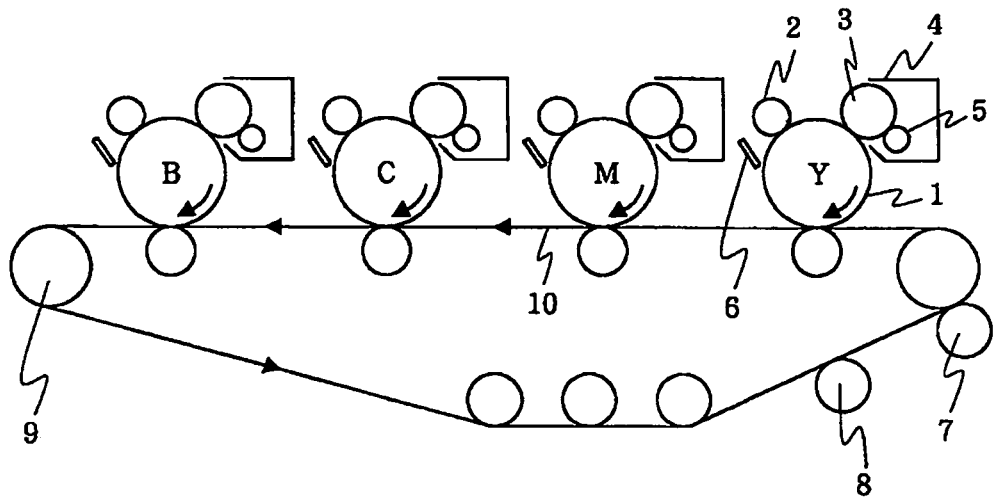
FIG. 2 is a schematic view showing an image forming apparatus of the tandem system using a transfer transport belt that is an example of an image forming apparatus of the present invention.

First, when the conductive endless belt of the present invention is, for example a transfer transport belt indicated by reference numeral 10 in FIG. 2, the belt is driven by a driving member such as driving roller 9, and toners are successively transferred onto a recording medium transported by the drive to form a color image.

Figure 3:
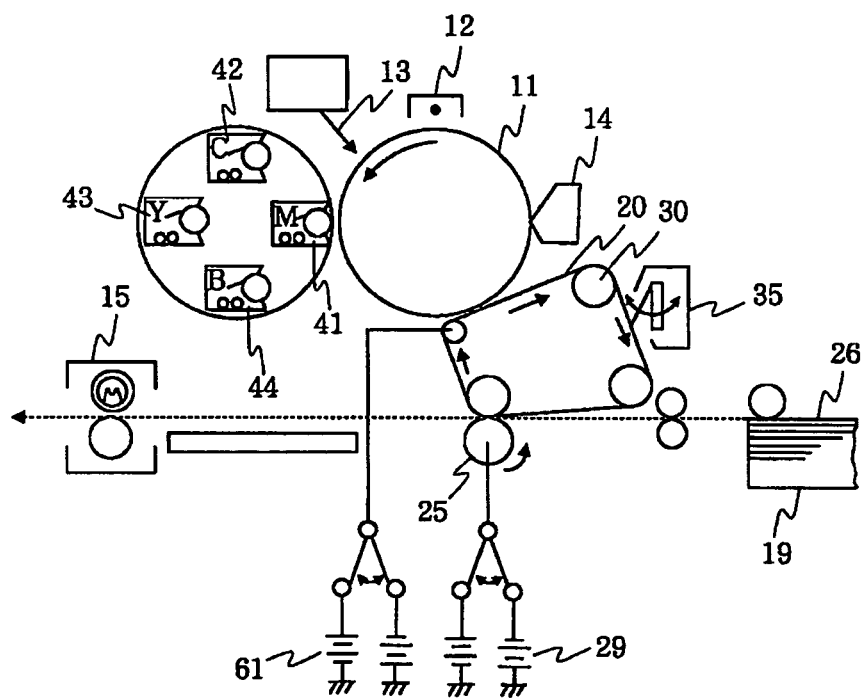
FIG. 3 is a schematic view showing an intermediate transferring apparatus using an intermediate transfer member that is another example of an image forming apparatus of the present invention.

Second, when a conductive endless belt of the present invention is, for example a intermediate transfer member indicated by reference numeral 20 in FIG. 3, by cyclically driving the belt with a driving member such as driving roller 30 and being arranged between a photoconductive drum (latent image carrier) 11 and a recording medium such as paper 26, a toner image formed on the surface of the photo conductive drum 11 is once transferred and held, and then transferred to the recording medium 26. In addition, the apparatus in FIG. 3 carries out color print by the intermediate transfer system as described above.

Figure 4:
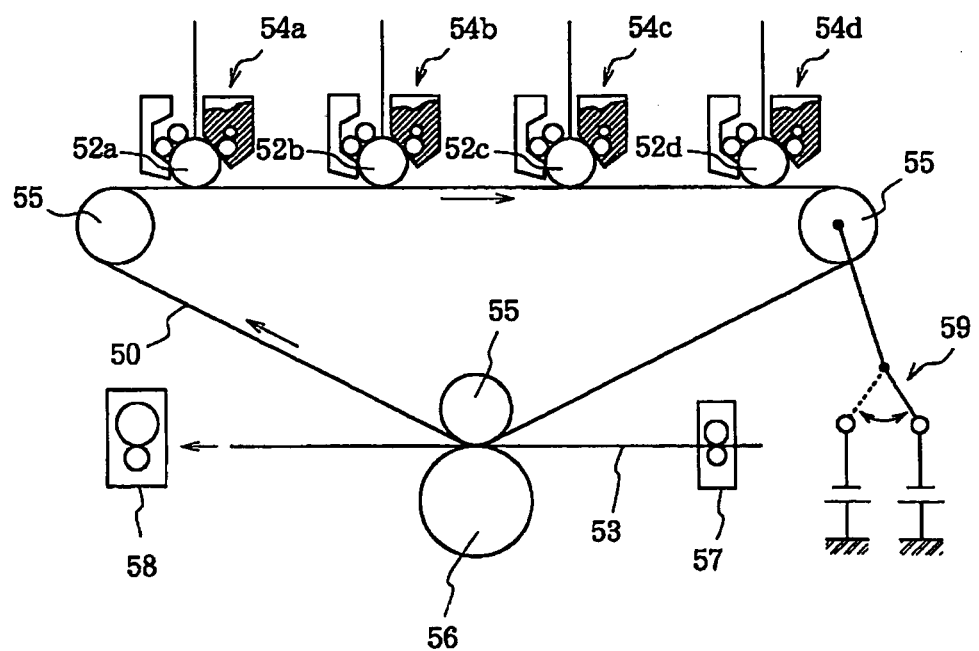
FIG. 4 is a schematic view showing a tandem intermediate transferring apparatus using a tandem intermediate transfer member that is another example of an image forming apparatus of the present invention.

Finally, when the conductive endless belt of the present invention is, for example a tandem intermediate transfer member indicated by reference numeral 50 in FIG. 4, the member is arranged between developing units 54a to 54d including photo conductive drum 52a to 52d and a recording medium such as paper 53, and is cyclically driven by a driving member such as driving roller 55, and four-color toner images formed on surfaces of respective photo conductive drum 52a to 52d are once transferred and held, and then the image is transferred to the recording medium 53 to form a color image.

Described below is a conductive endless belt according to the first invention.

The conductive endless belt of the first invention comprises a base composed of elastomer polyester with a crystalline melting point at 210° C. or more, preferably around 210 to 250° C., or composed of the elastomer polyester as a main component and a thermoplastic resin polyester at 49 wt % or less, to which a polymer ion conductive agent and a carbon black are added.

Using the elastomer polyester with such high fusing point enables the belt to keep high elastic and bending durability as well as to improve creep resistance.

In the present invention, the above mentioned elastomer polyester can be used for the base independently, it is preferred to add thereto a thermoplastic resin polyester at 49 wt % or less, specifically at about 20 to 40 wt %. By using the thermoplastic resin polyester with the elastomer polyester, a belt having much higher elastic can be implemented. However, if the blending amount of the thermoplastic resin polyester exceeds 49 wt %, the bending durability of the belt degrades and desired effect of the present invention cannot be obtained.

For the elastomer polyester used in the present invention, it is not specifically limited if a crystalline melting point at 210° C. or more is satisfied, and both a polyester-polyester type using polyester for hard segment and soft segment, and a polyester-polyether type using polyester for hard segment, polyether for soft segment respectively are preferably employed. For the hard segment of the elastomer polyester, typically polybutylene terephthalate (PBT) or polybutylene naphthalate (PBN) is used as main component, and both can be used in the present invention Also, for the thermoplastic polyester resin, specifically thermoplastic polyalkylene naphthalate resin (e.g. polyethylene naphthalate (PEN) resin, PBN resin, etc.), thermoplastic polyalkylene terephthalate resin (e.g., polyethylene terephthalate (PET) resin, glycol modified PET (PETG) resin, PBT resin, etc.) and so on are included, but it is not specifically limited These elastomer polyester and thermoplastic polyester resin have problem in mold heating which tends to cause molecular weight reduction due to hydrolytic cleavage, so that it is preferred to prevent molecular weight reduction by adding a compound having carbodiimide group to the base in order to re-crosslink thermoplastic elastomer polyester by reaction between carbodiimide group and carbonic acid. This prevents embitterment of the belt and enables improved heat crack resistance of the belt in endurance. Such carbodilmide compound can be obtained in the market easily, for example a product of Nisshin Spinning Co., LTD., carbodilite, and the like. In addition, carbodiimide compound can be used in conditions such as previously masterbatched pellet, for example, preferably products of Nisshin Spinning Co., LTD., carbodilite E pellet, B pellet, and the like.

Added amount of the carbodiimide compound is not specially limited, preferably 0.05 to 30 parts by weight, more preferably within the range of 0.1 to 5 parts by weight based on 100 parts by weight of the base resin.

Furthermore, for conductive materials to control conductivity in the present invention, a polymer ion conductive agent and a carbon black are combined. The combination of these enables obtaining a predetermined residence by small added amount and preventing elastic modulus degrading, and implements a belt with low resistance variation and environment dependency.

For the polymer ion conductive agent, since it has good compatibility with the elastomer polyester and does not give major bad effect to surface glossiness and bending durability, polyether esteramide can be used preferably. Additionally, other material described in, for example Japanese Published Unexamined Patent Application No. H9-227717, Japanese Published Unexamined Patent Application No. H10-120924, Japanese Published Unexamined Patent Application No. 2000-327922 and Japanese Published Unexamined Patent Application No. 2005-60658 can be used, but not specifically limited.

For example, a mixture composed of (A) organic polymer material, (B) ionic conductive polymer or copolymer, and (C) non organic or low molecular weight organic salt are included, wherein the component (A) is, polyacryate ester, polymethacrylate ester, polyacrylonitrile, poly-vinyl alcohol, polyvinyl acetate, polyamide such as polyamide 6, polyamide 12 or the like, polyurethane or polyester, the component (B) is oligoethoxylated aclylate, methacrylate, oligoethoxylated styrene about aromatic ring, polyether urethane, polyether urea, polyether amide, polyether esteramide or polyesterether block copolymer, and the component (C) is non organic, low molecular weight organic proton acid alkali metal, alkaline earth metal, zinc or ammonium salt, preferably, $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ or $Ca(CF_3SO_3)_2$, etc.

For the component (B) in described above, a polymer ion conductive agent containing polyether amide component, polyether esteramide component or polyester ether block copolymer component is preferable, and in addition, it is preferable that a low molecular ionic conductive agent component is included as the component (C). Furthermore, for such polyether amide component and polyether esteramide component, one with polyether component including ($CH_2$—$CH_2$—O) and polyamide component including polyamide 12 or polyamide 6 is preferable, and for the low molecular ionic conductive agent component of the component (C), polymer ion conductive agent $NaClO_4$ is especially preferable. Such polymer ion conductive agent, for example, Irgastat (registered brand) P18 and Irgastat (registered brand) P22 (both are manufactured by Ciba Specialty Chemicals Incorporated) can be easily get in the market.

Moreover, block copolymers made by polyolefin block and hydrophilic polymer block which are alternately bonded by repeating ester bond, amide bond, ether bond, urethane bond, imide bond, and so on, can be preferably used as a polymer ion conductive agent in the present invention. Such polyolefin is polyolefin having functional groups such as carboxyl group, hydroxyl group, amino group at both ends of polymer, specifically, polypropylene and polyethylene are preferable.

Also, for the hydrophilic polymer, polyether diols having hydroxyl group as functional groups such as polyoxyalkylene, polyether esteramide composed of polyamide and polyether diols of carboxyl group at each end, polyether amideimide composed of polyamideimide and polyether diols, polyether ester composed of polyester and polyether diols, polyether amide composed of polyamide and polyether diamine, and so on can be used, especially, polyoxyalkylene having hydroxyl group is preferable. For example, polyoxy ethylene having hydroxyl group at each end (polyethylene glycol), polyoxypropylene (polypropylene glycol) or the like is preferable.

In the present invention, such block copolymers usable as a polymer ion conductive agent can be easily obtained as PELESTAT 300, 303 (manufactured by Sanyo Chemical Industry LTD.), etc. Additionally, inclusion of a lithium compound $LiCF_3SO_3$ in the above mentioned block copolymers enables an effect where antistatic effect is kept even if the added amount is decreased, and as a mixture of such block copolymers and lithium compound, Sankonol TBX-310 (manufactured by Sanko Chemical Industry CO., LTD.) is available in the market.

In addition, as the carbon black, specifically, e.g. conductive carbon such as Kechen black, acetylene black, carbon for rubber such as SAF, ISAF, HAF, FEF, GPF, SRF, FT, MT, carbon for color (ink) that has been subjected to an oxidation treatment and the like, thermal decomposition subjected to an carbon, etc. are included.

For the belt of the present invention, the blending amount of the polymer ion conductive agent may be within the range of 1 to 40 parts by weight, preferably, within the range of 5 to 30 parts by weight based on 100 parts by weight of the base resin. Also, the blending amount of the carbon black may be within the range of 5 to 30 parts by weight based on 100 parts by weight of the base resin. By combining both within such range of the blending amount, the volume resistance value of the belt can be controlled, for example, within around $10^7$ to $10^{14}$, preferably $10^8$ to $10^{12.5}$ $\Omega \cdot cm$.

Moreover, in the present invention, a compatibility accelerator may be added in order to increase the compatibility between the base resin and the polymer ion conductive agent. The compatibility accelerator which is preferably used in the present invention is, for example, EVA/EPDM/polyolefin system graft copolymer, polyolefin system graft copolymer and reactive (including GMA, MAH) polyolefin system graft copolymer, P(St-co-GMA), EGMA, P(Et-co-EA-co-MAH), SEBS and its maleic anhydride modified agent, styrene systems or acrylonitrile styrene systems polymer including oxazoline group, maleic anhydride modified EPDM, maleic anhydride modified PE, maleic anhydride modified PP, maleic anhydride modified EVA, styrene maleic anhydride copolymer, SAN graft EPDM, reactive polystyrene, polyeaprolactone-b-polystyrene, reactive styrene acrylonitrile copolymer, imide polyaclylate, ethylene glycidyl methacrylate acrylic acid copolymer, chlorinated polyethylene, reactive phenoxy, silicon compound, peroxide polymer, polycaprolactone (respective abbreviated name of above described agents are, EVA: ethylene vinyl acetate copolymers, EPDM: ethylene-propylene diene terpolymers, EGMA: ethyleneglycidyl methacrylate copolymers, SEBS: styrene-ethylenebutadiene styrene copolymers, GMA: glycidyl methacrylate, MAH: maleic anhydride, EA: ethyl acrylate), etc. are included, and adding preferably 0.1 to 20 parts by weight of these compatibility accelerators based on the total amount 100 parts by weight of the base resin and the polymer ion conductive agent improves compatibility of both materials and enables uniform and good dispersion of the polymer ion conductive agent to the base, whereby a high performance conductive endless belt can be obtained.

Moreover, in the present invention, addition and control of conductivity can be carried out by adding other conductive material in addition to the carbon black and the polymer ion conductive agent, for example, a positive ion surfactant like quaternary ammonium, such as lauryl trimethyl ammonium, stearyl trimethyl ammonium, octadecyl trimethyl ammonium, dodecyl trimethyl ammonium, hexadecyl trimethyl ammonium, perchlorate of modified fatty acid, dimethyl ethylammonium, chlorate, boride fluoride hydrobromide, sulfate, etsulfate salt, benzylhalogenide salt (benzyl bromide salt, benzyl chloride, etc.) and the like; anion surfactant, such as fatty series sulfonic acid, higher alcohol sulfuric acid ester salt, higher alcohol ethylene oxide added sulfate, higher alcohol phosphoric acid ester salt; ampholytic surfactant such as various betaine and the like; anionic antistatic agent metal salts in the first group of periodic table such as higher alcohol ethylene oxide, polyethylene glycol fatty acid ester, antistatic agent such as multiple alcohol fatty acid ester, $LiCF_2SO_2$, $NaClO_4$, $LiBF_4$, NaCl and the like: metal salts in the second group of periodic table such as $Ca(ClO_4)_2$ and the like; natural graphite, artificial graphite and the like; metal and metal oxide such as tin oxide, titanium oxide, zinc oxide, nickel, steel and the like; and conductive polymer such as polyaniline, polypyrrole, polyacetylene and the like are included.

Additionally, for the belt in the present invention, other functional component can be added the present invention in proper manner within the range where the effect is not reduced, in addition to the above mentioned component, for example, various filling materials, coupling agent, anti oxidant, lubricant, finishing agent, pigment, ultraviolet absorber, antistatic agent, dispersant, corrector, forming agent, crosslinker, and the like can be properly blended. Also, coloring agent can be added to color.

The thickness of the conductive endless belt of the first invention is properly selected in accordance with the condition of the transfer transport belt or the intermediate transfer member, etc., but it is preferably within the range of 50 to 200 μm. Also, the surface roughness is preferably, 10 μm or less in JIS ten point height of irregularities Rz, specifically 6 μm or less, more precisely 3 μm or less.

Next, the conductive endless belt in the second invention is explained.

FIGS. 1A, B show a cross sectional view in width direction of a conductive endless belt of a preferred embodiment of the present invention. As shown in the figures, a conductive endless belt 100 of the present invention has a laminated structure comprising at least a base layer 101 and an outermost layer 102, wherein the base layer 101 is mainly composed of thermoplastic elastomer with a crystalline melting point at 210° C. or more, while the outermost layer 102 is mainly composed of thermoplastic resin. In other word, multilayering the belt and using different materials for each layer implements desired belt characteristics.

The base layer 101 in the belt of the present invention is the thickest layer in the laminated structure as described above, hence making up at least belt 50%, preferably 60 to 99% of total thickness. In the present invention, forming the base layer mainly by the thermoplastic elastomer with the crystalline melting point at 210° C. or more, preferably at 215 to 230° C., can implements a belt with tensile elastic modulus of 800 MPa or more, specifically 800 to 2000 MPa, so that superior bending durability can be obtained. In the case of thermoplastic elastomer with the crystalline melting point below 210° C., setting performance under high temperature and high humidity environment degrades and problems such as offset image may occur.

The thermoplastic elastomer used for the base layer is not especially limited if it has a crystalline melting point at 210° C. or more, for example, polyester system, polyamide system, polyether system, polyolefin system, polyurethane system, styrene system, acrylic, polydiene system, and the other various system are included, and preferably elastomer polyester is used. Specifically, elastomer polyester can be used together with polyester resin to preferably improve elastic modulus. In this case, the proportion of both may be, for example, 90 to 50 parts by weight of the elastomer polyester to 10 to 50 parts by weight of the polyester resin.

For such thermoplastic elastomer polyester, the same polymers as described in the first invention can be used. Also, for combining polyester-based resin, the same resins as described in the first invention can be used and not specifically limited.

In the case where the thermoplastic elastomer polyester is used for the base layer as main component, since it is polyester-based resin, as described above, it has problem in mold heating that tends to cause molecular weight reduction due to hydrolytic cleavage, so that it is preferred to prevent molecular weight reduction by adding a compound having carbodiimide group to the base in order to re-crosslink thermoplastic elastomer polyester by reaction between carbodiimide group and carbonic acid in the second invention as well. This prevents embitterment of the belt and enables improved heat crack resistance of the belt in endurance. Such carbodiimide compound can be preferably used the same one as described in the first invention.

The added amount of such carbodiimide compound is not specifically limited, but preferably 0.05 to 30 parts by weight, more preferably 0.1 to 5 parts by weight based on 100 parts by weight of the base layer resin component.

Additionally, regarding the thermoplastic resin used for the outermost layer of the belt in the second invention, it is preferred to use the one with high belt surface glossiness when forming the belt outermost layer by extrusion and higher glossiness is desirable. For example, the thermoplastic resin having a measurement value of glossiness measured by a glossmeter in the market of 60 or more, specifically 70 or more is preferable.

To more precise, for example, polyalkylene naphthalate resin (e.g. polyethylene naphthalate (PEN) resin, PBN resin, etc.), polyester-based resin such as polyalkylene terephthalate resin (e.g. polyethylene terephthalate (PET) resin, glycol modified PET (PETG) resin, PBT resin, etc.), polyamide (PA), acrylonitrile butadiene styrene (ABS) resin, polyacetal (POM), polyarylate (PAR), polycarbonate (PC), polyethylene (PE), polypropylene (PP), polystyrene (PS), polymethylmethacrylate (PMMA), polyphenylene sulfide (PPS), polyvinylidene fluoride (PVDF), acrylonitrile styrene (AS (SAN)), polyether sulfone (PES), polyether ether ketone (PEEK), polymethyl pentene (PMP), polyphenylene ether (PPE), ethylene tetrafluoro ethylene copolymers (ETFE) and the like are included, and one kind or two or more kinds of mixture from those can be used, preferably polyester-based resin is used.

When polyester-based resin is used for main component of the outermost layer, similarly to the above mentioned case of elastomer polyester, for the purpose of preventing molecular weight reduction caused by hydrolytic cleavage in mold heating, inclusion of the above mentioned carbodiimide compound in the outermost layer is preferred. In this case, the added amount of the carbodiimide compound is not specifically limited, but preferably 0.05 to 30 parts by weight, more preferably within the range of 0.1 to 5 parts by weight based on 100 parts by weight of the outer layer resin component.

The belt of the second invention is formed of a laminated structure comprising at least a base layer and an outermost layer, and other layers may be included between the base layer and the outermost layer, or an inner layer side of the base layer. However, in this case, the base layer has to be the thickest layer in the laminated structure as well. As such other layers, for example, layers having the structure similar to the outermost layer can be used by laminating the inner layer side of the base layer. Also, an adhesive line may be provided at between the base layer and the outermost layer.

Furthermore, for each layer forming the belt of the second invention, a conductive material is blended to control conductivity. Such conductive material is not specifically limited, so that well-known electron conductive agent and ionic conductive agent, etc. can be used in properly manner. For the electron conductive agent, to more precise, for example, conductive carbon such as Kechen black, acetylene black, carbon for rubber such as SAF, ISAF, HAF, FEF, GPF, SRF, FT, MT, carbon for color (ink) which has been subjected to an oxidation treatment and the like, thermal decomposition carbon, natural graphite, artificial graphite, stibium doped putty powder, metal and oxide metal such as titanium oxide, zinc oxide, nickel, steel, silver, germanium, conductive polymer such as polyaniline, polypyrrole, polyacetylene, conductive whisker such as carbon whisker, graphite whisker, titanium carbide whisker, conductive titanic acid potassium whisker, conductive titanic acid valium whisker, conductive titanium oxide whisker, conductive zinc oxide whisker are included. Also, for ionic conductive agent, specifically for example, perchlorate such as tetraethyl ammonium, tetrabutylammonium, dodeciltrimethyl ammonium, hexadeciltrimethyl ammonium, benziltrimethyl ammonium, modified fatty aciddimethyl ethylammonium, ammonium salt such as chlorate, hydrochloride, bromate, iodate, fluoroboric hydrobromide, sulfate, ethylsulfate, carboxylate, sulfonate, perchlorate of alkaline metal alkaline earth metal such as lithium, sodium, potassium, calcium, magnesium, chlorate, hydrochloride, bromate, iodate, fluoroboric hydrobromide, sulfate, trifluoromethyl sulfate, sulfonate, and so on are included.

Moreover, for conductive material in the second invention, the same polymer ion conductive agents as described in the first invention can be used preferably.

From these conductive materials, single one kind or combination of two or more kinds may be used, for example a combination of electron conductive agent and ionic conductive agent can be used, in this case, stable conductivity can be realized even under electric pressure variation being applied and environmental changes.

The blending amount of conductive material for each layer is, regarding the electron conductive agent, based on 100 parts by weight of resin component, normally 100 parts by weight or less, for example 1 to 100 parts by weight, specifically 1 to 80 parts by weight, more precisely 5 to 50 parts by weight. And regarding the ionic conductive agent, based on 100 parts by weight of resin component, normally within a range of 0.01 to 10 parts by weight, specifically 0.05 to 5 parts by weight is added. Furthermore, regarding high polymer ionic conductive agent, based on 100 parts by weight of resin component, normally 1 to 500 parts by weight, preferably 10 to 400 parts by weight is added. In the present invention, specifically, by using the carbon black as conductive material, adding 5 to 30 parts by weight of it based on 100 parts by weight of resin component is preferable.

In the case where the polymer ion conductive agent is used for conductive material, a compatibility accelerator may be added in order to increase the compatibility between the resin component and the high polymer ionic conductive agent. For such compatibility accelerator, the same one as described in the first invention can be used preferably, and preferably adding 0.1 to 20 parts by weight of such compatibility accelerator based on the total amount 100 parts by weight of the polymer component and the polymer ion conductive agent improves compatibility of both materials and enables uniform and good dispersion of the polymer ion conductive agent to the base, whereby a high performance conductive endless belt can be obtained.

Additionally, for the belt in the present invention, other functional components can be added in proper manner within the range where the effect is not reduced, in addition to the above mentioned components, for example, various filling material, coupling agent, anti oxidant, lubricant, finishing agent, pigment, ultraviolet absorber, antistatic agent, dispersant, corrector, forming agent, cross-linker, and so on can be properly blended. Also, coloring agent can be added to color.

The total thickness of the conductive endless belt of the second invention is properly selected in accordance with the condition of the transfer transport belt or the intermediate transfer member, etc., but it is preferably within the range of 50 to 200 μm. Also, the surface roughness is preferably, 10 μm or less in JIS ten point height of irregularities Rz, specifically 6 μm or less, further precisely 3 μm or less. Moreover, it is preferred that the volume resistance ratio is controlled within the range of $10^2$ Ω·cm to $10^{13}$ Ω·cm.

Figure 1:
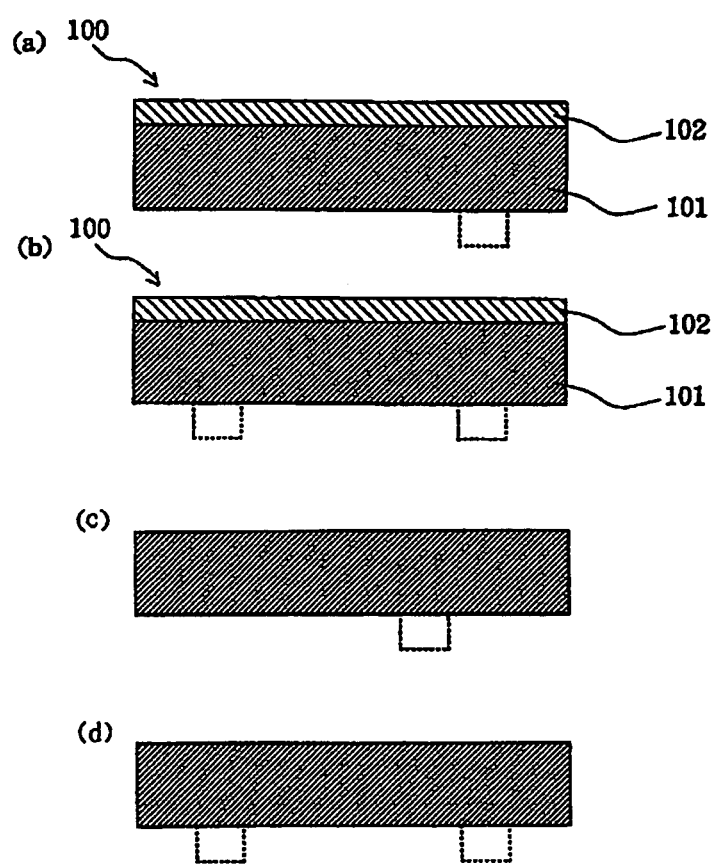
FIGS. 1(a), (b), (c) and (d) are cross sectional views in width direction of conductive endless belts with respect to embodiments of the present invention.
FIG. 1(b) is a cross sectional view of an embodiment of the second invention having two or more engaging units.
FIG. 1(c) is a cross sectional view of an embodiment of the first invention having one engaging unit.
FIG. 1(d) is a cross sectional view of an embodiment of the first invention having two or more engaging units.

Additionally, in the conductive endless belt of the first and the second invention, as indicated by dotted line in FIG. 1, on a surface contacting the driving member such as driving roller 9 of the image forming apparatus in FIG. 2 or driving roller 30 in FIG. 3, an engaging unit for engaging with another engaging unit (not shown) provided in the driving member may be provided, and by providing such engaging unit in the conductive endless belt of the first and the second invention and engaging it with the other engaging unit provided in the driving member to operate, deviation in the width direction of the conductive endless belt can be prevented.

In this case, the engaging unit is not specifically limited, but as shown in FIG. 1, it is preferred that the shape is consecutive ridge along with the circumferential direction (rotative direction) of the belt, and the unit is engaged with a groove formed on the peripheral surface of the driving member such as driving roller along with the circumferential direction.

In FIG. 1(*a*) (the belt of the second invention), (*c*) (the belt of the first invention), one consecutive ridge is illustrated as an engaging unit, but this engaging unit can be protruded such that multiple ridge portions are arranged in a raw along with the belt circumferential direction (rotative direction), or providing two or more engaging units (FIG. 1(*b*) (the belt of the second invention), (*d*) (the belt of the first invention)), or providing the unit in the center in width direction of the belt is also possible. Moreover, not employing the ridge shown in FIG. 1 as a engaging unit but providing a groove along with the belt circumferential direction (rotative direction) to engage with the ridge provided on the peripheral surface of the driving member such as driving roller along with the circumferential direction is also possible.

The image forming apparatus of the present invention using the conductive endless belt of the first and the second invention includes the tandem system one shown in FIG. 2, the intermediate transfer system one shown in FIG. 3, or the tandem intermediate transfer one shown in FIG. 4 as examples, but not limited to these. In the case of the apparatus in FIG. 3, a driving roller 23 or a driving gear which rotates the intermediate transfer member 20 of the present invention can be applied electric pressure from a power supply 61 in proper manner, and electric pressure of this case can be fitly selected an application condition from only direct current application, alternate current superposing direct current application, and so on.

The conductive endless belt of the first invention can be preferably manufactured by extrusion molding of resin component matter including the above mentioned base resin and conductive material, to more precise, for example by a double shaft kneader, resin component matter composed of the base and functional component such as conductive material is kneaded, and an obtained kneaded matter is extrusion molded with an annular dice to manufacture a belt. Or, powder coating process such as electrostatic coating, dipping process or centrifugal casting process can be preferably employed as well.

In addition, the conductive endless belt of the second invention is manufactured by coextrusion of each layer that forming the laminated structure, and there is an advantage in the point that desired high surface glossiness can be obtained even though using such process of manufacture.

The following examples are given for the purpose of illustration of this invention and are not intended as limitations thereof.

The first invention is precisely explained below with using examples.

With blends listed in Tables 1 to 4 below, conductive endless belts of each examples and comparative examples were made. To more precise, each blended component was fusion kneaded by a double shaft kneader, and then an obtained kneaded matter was extrusion molded with a predetermined annular dice to obtain conductive endless belts having a bore diameter of 220 mm, thickness of 100 μm, and a width of 250 mm. The temperature of kneading and extrusion molding was at 250° C. for examples 1-7 to 1-12, and 240° C. for the other examples and comparative examples. For obtained belt of each examples and comparative examples, evaluation was carried out in accordance with the following procedures. These results are shown in Tables 1 to 4 below at the same time.

<Tensile Elastic Modulus Measurement>

With conditions shown in below, tensile elastic modulus measurement was carried out.

Device: Shimadzu Corporation, tensile tester, EZ test (Analysis software: Trappezium)

Sample: Strip shape (length 100 mm by width 10 mm by standard thickness 100 μm)

Tensile speed: 5 mm/sec

Data sampling interval: 100 msec

Measuring method: slope with elongation of 0.5 to 0.6% (tangential method described in JIS if it is noted)

Measuring environment: Ambient temperature (23±3° C. 55±10% RH)

<Number of Times of Bending Endurance>

Number of times of bending endurance was measured with the condition where specimens with length 100 mm and width 15 mm were cut off each belt, using a MIT abrasion resistance fatigue testing machine manufactured by Toyo Seiki Co., Ltd., bending speed was 175 times/min, rotation angle was 135 degree, and tensile stress was 14.7 N (1.5 kgf). Results were shown in index number setting the comparative examples 1-5 to 3000. The higher the value is, the better the result is.

<Creep Resistance>

Specimens with length 150 mm and width 10 mm were cut off from each belt, were marked guidelines spacing 100 mm in length direction, and then were left under an environment of temperature at 60° C. and relative humidity at 85% for four hours, with being applied a 200 g of load in length direction. Creep strains were found in accordance with the formula below, wherein gauge length before leaving is $L_0$, and gauge length after leaving is $L_1$. The evaluation results were expressed by ○ when creep strain is 0.5% or less, or x when over 0.5%. The gauge length was measurably applying a 200 g of load in length direction after leaving the specimens under an environment of temperature at 23° C. and relative humidity at 50% for one hour or more.

$$\text{Creep strain (\%)} = \{(L_1 - L_0)/L_0\} \times 100$$

<Volume Resistance Measurement>

Under temperature at 23° C. and relative humidity at 50%, using an ohm meter R8340A manufactured by Advantest Corporation connected with a sample chamber R12704A as a measuring device, the measurement was carried out with 500 V of electric pressure to calculate an average value of twenty points measured with 20 mm pitch in circumferential direction.

<Evaluation of volume resistance variation in circumferential direction>

Using the maximum value $R_{max}$ and the minimum value $R_{min}$ of resistance value of 20 points measured with 20 mm pitch in circumferential direction, variations were calculated from the formula below. If digit number is 1 or less, the condition is good.

(Digit number)=log $(R_{max}/R_{min})$

<Evaluation of Volume Resistance Environment Dependency>

Each belt was left under a low temperature and low humidity (LL) environment (12° C. 10% RH) and a high temperature and high humidity (HH) environment (32.5° C. 85% RH) for twenty four hours, then volume resistance value $R_{LL}$, $R_{HH}$ was calculated with measurement electric pressure 500 V respectively, and the evaluation was carried out in accordance with the formula below. If digit number is 2.5 or less, the condition is good.

(Digit number)=log $(R_{LL}/R_{HH})$

TABLE 1

| | | | Crystalline melting point (° C.) | Example 1-1 | Example 1-2 | Example 1-3 | Example 1-4 |
|---|---|---|---|---|---|---|---|
| Structural material (parts by weight) | Elastomer polyester*1 | (1) | 222 | 100 | 80 | 60 | 60 |
| | | (2) | 241 | — | — | — | — |
| | | (3) | 203 | — | — | — | — |
| | Polyester resin | PBT*2 | | — | 20 | 40 | 40 |
| | | PBN*3 | | — | — | — | — |
| | Carbodiimide compound*4 | Carbodilite HMV8CA | | — | — | — | 1 |
| | | Carbodilite E pellet | | — | — | — | — |
| | Conductive agent | Polyester eteramide*5 | | 20 | 20 | 30 | 30 |
| | | Carbon black*6 | | 7 | 7 | 7 | 7 |
| Belt solid state property | Tensile elastic modulus (MPa) | | | 800 | 900 | 1000 | 1050 |
| | Number of times of bending endurance (Index number) | | | >10000 | >10000 | >10000 | >10000 |
| | Creep resistance | | | ○ | ○ | ○ | ○ |
| | Volume resistance (500 V) (Ω · cm) | | | $2 \times 10^{10}$ | $5 \times 10^{10}$ | $4 \times 10^{10}$ | $5 \times 10^{10}$ |
| | Volume resistance variation in circumferential direction (Digit number) | | | 0.8 | 0.8 | 0.6 | 0.5 |
| | Volume resistance environment dependency (Digit number) | | | 1.9 | 2 | 2.3 | 2.2 |

*1 Elastomer polyester (both are manufactured by Toyobo Co. LTD,.): (1) Pelprene E-450B, (2) Pelprene EN-16000. (3) Pelprene P-90B
*2 PBT: manufactured by Toray Industries, Inc. Toraycon 1401CH2
*3 PBN: manufactured by Teijin Chemicals LTD., TQB-OT
*4 Carbodiimide compound: manufactured by Nisshin Spinning Co., LTD., carbodilite
*5 Polyether esteramide: manufactured by Sanyo Chemical Industry LTD, Pelestat NC6321
*6 Carbon black: manufactured by Denki Kagaku Kogyo K.K., Denka black particle

TABLE 2

| | | | Crystalline melting point (° C.) | Example 1-5 | Example 1-6 | Example 1-7 | Example 1-8 |
|---|---|---|---|---|---|---|---|
| Structural material (parts by weight) | Elastomer polyester*1 | (1) | 222 | 51 | 51 | — | — |
| | | (2) | 241 | — | — | 100 | 80 |
| | | (3) | 203 | — | — | — | — |
| | Polyester resin | PBT*2 | | 49 | 49 | — | — |
| | | PBN*3 | | — | — | — | 20 |
| | Carbodiimide compound*4 | Carbodilite HMV8CA | | 1 | — | — | — |
| | | Carbodilite E pellet | | — | — | — | — |
| | Conductive agent | Polyester eteramide*5 | | 30 | 10 | 20 | 20 |
| | | Carbon black*6 | | 7 | 12 | 8 | 8 |
| Belt solid state property | Tensile elastic modulus (MPa) | | | 1150 | 1350 | 1100 | 1200 |
| | Number of times of bending endurance (Index number) | | | >10000 | >10000 | >10000 | >10000 |
| | Creep resistance | | | ○ | ○ | ○ | ○ |
| | Volume resistance (500 V) (Ω · cm) | | | $6 \times 10^{10}$ | $3 \times 10^{10}$ | $2 \times 10^{10}$ | $3 \times 10^{10}$ |
| | Volume resistance variation in circumferential direction (Digit number) | | | 0.6 | 0.9 | 0.7 | 0.8 |
| | Volume resistance environment dependency (Digit number) | | | 2.1 | 2.5 | 1.8 | 1.9 |

TABLE 3

| | | | Crystalline melting point (° C.) | Example 1-9 | Example 1-10 | Example 1-11 | Example 1-12 |
|---|---|---|---|---|---|---|---|
| Structural material (parts by weight) | Elastomer polyester*1 | (1) | 222 | — | — | — | — |
| | | (2) | 241 | 60 | 60 | 51 | 51 |
| | | (3) | 203 | — | — | — | — |
| | Polyester resin | PBT*2 | | — | — | — | — |
| | | PBN*3 | | 40 | 40 | 49 | 49 |
| | Carbodiimide compound*4 | Carbodilite HMV8CA | | — | — | — | — |
| | | Carbodilite E pellet | | — | 3 | 3 | — |
| | Conductive agent | Polyester eteramide*5 | | 30 | 30 | 30 | 10 |
| | | Carbon black*6 | | 8 | 8 | 8 | 13 |
| Belt solid state property | Tensile elastic modulus (MPa) | | | 1300 | 1350 | 1400 | 1500 |
| | Number of times of bending endurance (Index number) | | | >10000 | >10000 | >10000 | >10000 |
| | Creep resistance | | | ○ | ○ | ○ | ○ |
| | Volume resistance (500 V) (Ω · cm) | | | $2 \times 10^{10}$ | $4 \times 10^{10}$ | $2 \times 10^{10}$ | $4 \times 10^{10}$ |
| | Volume resistance variation in circumferential direction (Digit number) | | | 0.8 | 0.7 | 0.6 | 1 |
| | Volume resistance environment dependency (Digit number) | | | 2.1 | 2.1 | 1.9 | 2.4 |

TABLE 4

| | | | Crystalline melting point (° C.) | Comparative example 1-1 | Comparative example 1-2 | Comparative example 1-3 | Comparative example 1-4 | Comparative example 1-5 | Comparative example 1-6 |
|---|---|---|---|---|---|---|---|---|---|
| Structural material (parts by weight) | Elastomer polyester*1 | (1) | 222 | 100 | 100 | 100 | 100 | 20 | — |
| | | (2) | 241 | — | — | — | — | — | — |
| | | (3) | 203 | — | — | — | — | — | 60 |
| | Polyester resin | PBT*2 | | — | — | — | — | 80 | 40 |
| | | PBN*3 | | — | — | — | — | — | — |
| | Conductive agent | Polyester eteramide*5 | | 20 | 50 | — | — | 20 | 20 |
| | | Carbon black*6 | | — | — | 7 | 18 | 7 | 5 |
| Belt solid state property | Tensile elastic modulus (MPa) | | | 700 | 500 | 900 | 1100 | 1300 | 600 |
| | Number of times of bending endurance (Index number) | | | >10000 | >10000 | >10000 | >10000 | 3000 | >10000 |
| | Creep resistance | | | ○ | X | ○ | ○ | ○ | X |
| | Volume resistance (500 V) (Ω · cm) | | | $2 \times 10^{13}$ | $2 \times 10^{10}$ | $5 \times 10^{14}$ | $1 \times 10^{10}$ | $1 \times 10^{10}$ | $2 \times 10^{10}$ |
| | Volume resistance variation in circumferential direction (Digit number) | | | 0.3 | 0.2 | 1.8 | 1.3 | 0.7 | 0.6 |
| | Volume resistance environment dependency (Digit number) | | | 2.8 | 3.1 | 1.1 | 1.2 | 1.9 | 1.9 |

Above Tables 1 to 4 show that the belts in each example obtained good results for each evaluation item including the tensile elastic modulus, the number of times of bending endurance (Index number), the creep resistance, the volume resistance and its variation in circumferential direction, and the environment dependency. On the other hand, the belt of the comparative example 1-1 had a great environment dependency, the belt of the comparative example 1-2 had an inferior creep resistance and a great environment dependency, the belt of the comparative example 1-3 couldn't get a predetermined resistance value, and also had a wide resistance variation, the belt of the comparative example 1-4 had a wide resistance variation, the belt of the comparative example 1-5 had an inferior bending resistance, and the belt of the comparative example 1-6 had a bad creep resistance, consequently all didn't sufficiently satisfy the desired belt performance.

Second, the second invention is precisely explained by using examples.

With blends listed in Tables 5 to 7 below, conductive endless belts of each example and comparative examples were made. To more precise, each blended component was fusion kneaded by a double shaft kneader, then an obtained kneaded matters were extruded respectively with a extrusion machine with a diameter of 40 mm to obtain conductive endless belts having a bore diameter of 220 mm, total thickness of 100 μm (thicknesses of each layer are listed in tables), and a width of 250 mm. For examples 2-1 to 2-4, 2-6 to 2-11 and comparative examples 2-1, and for examples 2-5, two types of two-layer annular dices and two types of three-layer annular dices (the outermost layer has the same structure as the internal layer) were used respectively, and for comparative examples 2-2 to 2-4, a single layer annular dice was used. For obtained belts of each examples and comparative examples, evaluations were carried out in accordance with the following procedures. These results are shown in Tables 5 to 7 below at the same time.

<Tensile Elastic Modulus Measurement>
With the same conditions as in example 1-1, etc., tensile elastic modulus measurement was carried out.

<Volume Resistance Ratio Measurement>
Under a temperature at 20° C. and relative humidity at 50%, using an ohm meter R8340A manufactured by Advantest Corporation connected with a sample chamber R12704A as a measuring device, the measurement was carried out with 500 V of electric pressure to calculate an average value of twenty points measured with 20 mm pitch in circumferential direction <Number of Times of Bending Endurance>
Number of times of bending endurance was measured with the same conditions as in examples 1-1, etc. Results were shown in index number setting the comparative example 2-2 to 800. The higher the value is, the better the result is.

<Glossiness>
Handy glossmeter IG-320 manufactured by Horiba LTD. was used for measurement.

<Setting Residence>
Under an environment of a temperature at 60° C. and relative humidity at 85%, each belt was left for twenty four hours while being wrapped around the driving roller with tensile load, and then operational performance was evaluated by being mounted to an actual machine. When operational performance has no change, the result was expressed by "○", and when some meandering or idling occurred, was expressed by "Δ, and when heavy meandering or idling occurred, was expressed by "x".

<Offset Image>
The belts of each example and comparative example were mounted on an image forming apparatus of the tandem system shown in FIG. 2 to evaluate the presence of offset image occurrence when carrying out transfer operation. When offset image didn't occur, the result was expressed by "○", and when significant offset occurred, was expressed by "x".

TABLE 5

|  |  | Example 2-1 | Example 2-2 | Example 2-3 | Example 2-4 | Example 2-5 |
|---|---|---|---|---|---|---|
| Outermost layer (parts by weight) | PBT*7 | 100 | 100 | — | — | — |
|  | PET*8 | — | — | 100 | — | — |
|  | PBT-G*9 | — | — | — | 100 | — |
|  | PBN*10 | — | — | — | — | 100 |
|  | Carbodiimide compound*11 | — | — | — | — | 3 |
|  | Carbon black*12 | — | 8 | 8 | 10 | 8 |
| Kneading temperature (° C.) |  | No kneading | 240 | 260 | 250 | 250 |
| Base layer (parts by weight) | Elastomer polyester A*13 | 100 | 100 | 100 | 100 | 100 |
|  | Elastomer polyester B*14 | — | — | — | — | — |
|  | Carbodiimide compound*11 | 3 | 3 | 3 | 3 | 3 |
|  | Carbon black*12 | 15 | 15 | 15 | 15 | 15 |
| Kneading temperature (° C.) |  | 230 | 230 | 230 | 230 | 230 |
| Belt forming temperature (° C.) |  | 240 | 240 | 260 | 250 | 250 |
| Thickness structure ((Outer layer/base layer) (/Internal layer)) |  | Two-layer 8/92 | Two-layer 20/80 | Two-layer 10/90 | Two-layer 20/80 | Three-layer 10/80/10 |
| Tensile elastic modulus (MPa) |  | 1100 | 1400 | 1300 | 1300 | 1300 |
| Volume resistance (500 V) (Ω·cm) |  | $8 \times 10^{10}$ | $2 \times 10^{10}$ | $4 \times 10^{10}$ | $3 \times 10^{10}$ | $5 \times 10^{10}$ |
| Number of times of bending endurance (Index number) |  | 10000 or more | 10000 or more | 10000 or more | 10000 or more | 10000 or more |
| Glossiness |  | 95 | 93 | 94 | 95 | 93 |
| Setting residence |  | ○ | ○ | ○ | ○ | ○ |
| Offset image |  | ○ | ○ | ○ | ○ | ○ |

*7PBT: manufactured by Polyplastics Co. Julanex 800FP
*8PET: manufactured by Unitika Ltd. product name SA1206
*9PET-G: manufactured by Eastman chemical CO. product name Easter 6763
*10PBN: manufactured by Teijin Chemicals LTD., TQB-OT
*11Carbodiimide compound: manufactured by Nisshin Spinning Co., LTD., Carbodilite E pellet
*12Carbon black: manufactured by Denki Kagaku Kogyo K.K., Denka black particle
*13Elastomer polyester A: manufactured by Toyobo Co., LTD., Pelprene E-450B (crystalline melting point 222° C.)
*14Elastomer polyester B: manufactured by Toyobo Co., LTD., Pelprene P-90B (crystalline melting point 203° C.)

TABLE 6

|  |  | Comparative example 2-1 | Comparative example 2-2 | Comparative example 2-3 | Comparative example 2-4 |
|---|---|---|---|---|---|
| Outermost layer (parts by weight) | PBT*7 | — | — | — | — |
|  | PET*8 | — | — | — | — |
|  | PBT-G*9 | — | — | — | — |
|  | PBN*10 | 100 | 100 | — | — |
|  | Carbodiimide compound*11 | 3 | 3 | — | — |
|  | Carbon black*12 | 8 | 15 | — | — |
| Kneading temperature (° C.) |  | 250 | 250 | — | — |
| Base layer (parts by weight) | Elastomer polyester A*13 | — | — | 100 | — |
|  | Elastomer polyester B*14 | 100 | — | — | 100 |
|  | Carbodiimide compound*11 | 3 | — | 3 | 3 |
|  | Carbon black*12 | 18 | — | 15 | 15 |
| Kneading temperature (° C.) |  | 210 | — | 230 | 210 |
| Belt forming temperature (° C.) |  | 250 | 250 | 230 | 210 |
| Thickness structure ((Outer layer/base layer) (/Internal layer)) |  | Two-layer 20/80 | One-layer | One-layer | one-layer |
| Tensile elastic modulus (MPa) |  | 500 | 2000 | 1000 | 400 |
| Volume resistance (500 V) (Ω·cm) |  | $2 \times 10^{10}$ | $5 \times 10^{10}$ | $6 \times 10^{10}$ | $6 \times 10^{10}$ |
| Number of times of bending endurance (Index number) |  | 10000 or more | 800 | 10000 or more | 10000 or more |
| Glossiness |  | 94 | 85 | 65 | 55 |
| Setting residence |  | Δ | ○ | ○ | ○ |
| Offset image |  | x | ○ | ○ | ○ |

TABLE 7

|  |  | Example 2-6 | Example 2-7 | Example 2-8 | Example 2-9 | Example 2-10 | Example 2-11 |
|---|---|---|---|---|---|---|---|
| Outermost layer (parts by Weight) | PBT*7 | 100 | 100 | 100 | 100 | — | — |
|  | PET*8 | — | — | — | — | — | — |
|  | PBT-G*9 | — | — | — | — | — | — |
|  | PBN*10 | — | — | — | — | 100 | 100 |
|  | Carbodiimide compound*11 | — | — | — | — | 3 | 3 |
|  | Carbon black*12 | 8 | 8 | 8 | 8 | 8 | 8 |
| Kneading temperature (° C.) |  | 240 | 240 | 240 | 240 | 250 | 250 |
| Base layer (parts by weight) | Elastomer polyester A*13 | 80 | 60 | 60 | 60 | — | — |
|  | Elastomer polyester B*14 | — | — | — | — | — | — |
|  | Elastomer polyester C*15 | — | — | — | — | 80 | 60 |
|  | PBT*7 | 20 | 40 | 40 | 40 | — | — |
|  | PBN*10 | — | — | — | — | 20 | 40 |
|  | Carbodiimide compound*11 | — | — | — | — | 3 | 3 |
|  | Carbon black*12 | 16 | 16 | 7 | 7 | 16 | 16 |
|  | Polyether esteramide*16 | — | — | 20 | 30 | — | — |
| Kneading temperature (° C.) |  | 235 | 240 | 240 | 240 | 245 | 250 |
| Belt forming temperature (° C.) |  | 240 | 240 | 240 | 240 | 250 | 250 |
| Thickness structure ((Outer layer/base layer) (/Internal layer)) |  | Two-layer 2/80 | Two-layer 20/80 | Two-layer 20/80 | Two-layer 20/80 | Two-layer 20/80 | Two-layer 20/80 |

TABLE 7-continued

|  | Example 2-6 | Example 2-7 | Example 2-8 | Example 2-9 | Example 2-10 | Example 2-11 |
|---|---|---|---|---|---|---|
| Tensile elastic modulus (MPa) | 1500 | 1700 | 1500 | 1400 | 1550 | 1750 |
| Volume resistance (500 V) (Ω · cm) | $2 \times 10^{10}$ | $6 \times 10^{10}$ | $4 \times 10^{10}$ | $7 \times 10^{9}$ | $3 \times 10^{10}$ | $3 \times 10^{10}$ |
| Number of times of bending endurance (Index number) | 10000 or more | 10000 or more | 10000 or more | 10000 or more | 10000 or more | 10000 or more |
| Glossiness | 95 | 94 | 94 | 93 | 95 | 95 |
| Setting residence | ○ | ○ | ○ | ○ | ○ | ○ |
| Offset image | ○ | ○ | ○ | ○ | ○ | ○ |

*[15]Polyester elastomer C: manufactured by Toyobo Co. LTD, Pelprene EN-16000 (crystalline melting point 241° C.)
*[16]Polyether esteramide: manufactured by Sanyo Chemical Industry LTD, Pelestat NC6321

As shown in above Tables 5 to 7, the belts of examples using the thermoplastic elastomer with the crystalline melting point at 210° C. or more for the base layer of the laminated structure as the base and thermoplastic resin for the outermost layer as the base can keep the belt performance such as tensile elastic modulus while having superior durability, and satisfy the desired performance in the glossiness and the setting performance at the same time. Therefore, an image forming apparatus using such belt of the present invention can provide a good image without causing problems such as offset image due to the elongation or deformation of the belt

What is claimed is:

1. A conductive endless belt for transferring and transporting of the tandem system in which a recording medium held by electrostatic attraction, is driven cyclically by a driving member and transported to four kinds of image forming bodies, and respective toner images are successively transferred to the recording medium,
    comprising a base comprising an elastomer polyester with a crystalline melting point at 222 to 241° C. at 51 to 80 wt % as a main component thereof and a thermoplastic polyester-based resin at 20 to 49 wt %, to which a polymer ion conductive agent and a carbon black are added,
    wherein a blending amount of the polymer ion conductive agent is within the range of 10 to 30 parts by weight based on 100 parts by weight of the base, and
    wherein a blending amount of the carbon black is within the range of 7 to 13 parts by weight based on 100 parts by weight of the base.

2. A conductive endless belt of an intermediate transfer member provided between an image forming body and an recording medium which is driven cyclically by a driving member, for once transferring a toner image formed on a surface of image forming body to a surface of the belt to hold and then transferring the image to the recording medium,
    comprising a base comprising an elastomer polyester with a crystalline melting point at 222 to 241° C. at 51 to 80 wt % as a main component thereof and a thereof and a thermoplastic polyester-based resin at 20 to 49 wt %, to which a polymer ion conductive agent and a carbon black are added,
    wherein a blending amount of the polymer ion conductive agent is within the range of 10 to 30 parts by weight based on 100 parts by weight of the base, and
    wherein a blending amount of the carbon black is within the range of 7 to 13 parts by weight based on 100 parts by weight of the base.

3. A conductive endless belt of tandem intermediate transfer member provided between four kinds of image forming bodies and a recording medium, which is driven cyclically by a driving member for once transferring a toner image formed on a surface of four kinds of image forming bodies to a surface of the belt to hold successively and then transferring the image to the recording medium,
    comprising a base comprising an elastomer polyester with a crystalline melting point at 222 to 241° C. at 51 to 80 wt % as a main component thereof and a thermoplastic polyester-based resin at 20 to 49 wt %, to which a polymer ion conductive agent and a carbon black are added,
    wherein a blending amount of the polymer ion conductive agent is within the range of 10 to 30 parts by weight based on 100 parts by weight of the base, and
    wherein a blending amount of the carbon black is within the range of 7 to 13 parts by weight based on 100 parts by weight of the base.

4. The conductive endless belt according to any one of claims 1 to 3, wherein said polymer ion conductive agent is polyether ester amide.

5. The conductive endless belt according to any one of claims 1 to 3, wherein said thermoplastic polyester-based resin is polybutylene terephthalate or polybutylene naphthalate.

6. An image forming apparatus, which comprises using the conductive endless belt according to any one of claims 1 to 3.

* * * * *